Patented Oct. 11, 1949

2,484,487

UNITED STATES PATENT OFFICE 2,484,487

PROCESS FOR PREPARING GLYCOL MONO-ESTERS OF ACRYLIC AND α-METH-ACRYLIC ACIDS

John R. Caldwell, Kingsport, Tenn., assignor to Eastman Kodak Company, Rochester, N. Y., a corporation of New Jersey No Drawing. Application September 8, 1948, Serial No. 48,318

8 Claims. (Cl. 260—486)

This invention relates to a process for preparing glycol monoesters comprising reacting an alkylene oxide and acrylic or α-methacrylic acid, in the presence of a tertiary amine catalyst.

It is known in the art that carboxylic acids and ethylene oxide react in the presence of sulfuric acid, as a catalyst, to form glycol monoesters. However, in this process a consecutive reaction takes place forming the diester to an appreciable extent. In fact, the process can be employed for preparing glycol diesters. See U. S. Patent 1,810,318, issued June 16, 1931 to Oskar Loehr.

I have found that this consecutive reaction which is objectionable in the production of glycol monoesters can be overcome in the case of acrylic and α-methacrylic acids, by reacting the acrylic acid and an alkylene oxide, in the presence of a tertiary amine catalyst. This process gives higher yields as compared with other processes disclosed in the prior art because the reaction takes only one course thereby forming substantially no by-products.

It is an object of my invention to provide an improved process for preparing glycol monoesters of acrylic and methacrylic acids. These glycol monoesters (β-hydroxyalkyl acrylates and α-methacrylates) are useful intermediates for the preparation of polymers. They may be polymerized alone or in conjunction with other unsaturated compounds, such as methyl α-methacrylate, ethyl α-methacrylate, acrylonitrile, vinyl acetate, dimethyl fumarate, methyl acrylate, ethyl acrylate, styrene, etc. by heating in the presence of a polymerization catalyst, such as benzoyl peroxide, etc. Other objects of my invention will become apparent hereinafter.

Specifically, in practicing my invention four combinations of compounds can be used in the process.

1. Acrylic acid and ethylene oxide react in the presence of a tertiary amine catalyst to form ethylene glycol monoacrylate (β-hydroxyethyl acrylate).

2. Acrylic acid and propylene oxide react in the presence of a tertiary amine catalyst to form propylene glycol monoacrylate (β-hydroxypropyl acrylate).

3. α-Methacrylic acid and ethylene oxide react in the presence of a tertiary amine catalyst to form ethylene glycol monomethacrylate (β-hydroxyethyl α-methacrylate).

4. α-Methacrylic acid and propylene oxide react in the presence of a tertiary amine catalyst to form propylene glycol monomethacrylate (β-hydroxypropyl α-methacrylate).

An excess of from 10 to 20 per cent alkylene oxide is advantageously employed.

Any tertiary amine having a dissociation constant in water at 25° C. from $1 \times 10^{-8}$ to $1 \times 10^{-10}$, such as dimethylaniline, diethylaniline, pyridine, quinoline, β-picoline, ethylpyridine, dimethylpyridine, etc., can be used in practicing my invention. From 0.1 to 5.0 per cent catalyst is advantageously used, based on the weight of the acrylic or α-methacrylic acid.

A temperature range of from 50° to 80° C., and especially 70° to 75° is advantageously employed in practicing my invention. The reaction usually requires 24 to 48 hours.

Solvents such as benzene, isopropyl ether, 1,4-dioxane, methyl alcohol, ethyl alcohol, etc., can be used as a reaction medium in practicing my invention. Water can, also, be employed as a solvent but the products are more difficult to isolate from a water solution. The glycol monoester products are isolated by vacuum distillation of the reaction mixture.

Hydroquinone, copper (e. g. copper acetate) or other polymerization inhibitor is advantageously added to the reaction mixture to retard polymerization.

The practice of my invention is further illustrated by the following examples:

*Example 1.—β-Hydroxyethyl acrylate*

36 grams of acrylic acid, 25 grams of ethylene oxide, 50 cc. of benzene, 0.1 gram of hydroquinone, and 0.5 gram of pyridine were heated in an autoclave at 75° to 80° C. for 48 hours. The reaction mixture was neutral at the end of that time, indicating that the acrylic acid had been completely esterified. The mixture was, then, distilled under reduced pressure. 30 grams of β-hydroxyethyl acrylate boiling at 77° to 80° at 4 mm. of Hg pressure were obtained. The β-hydroxyethyl acrylate obtained from the reaction mixture had a saponification value of 115 against a calculated saponification value of 116. The product had a refractive index ($^{20}$D) of 1.4415.

*Example 2.—β-Hydroxyethyl α-methacrylate*

86 grams of α-methacrylic acid, 50 grams of ethylene oxide, 100 cc. of benzene, 0.2 gram of hydroquinone, and 0.5 cc. of pyridine were heated in an autoclave at 60° to 70° C. for 24 hours. The mixture was, then, distilled under reduced pressure and 60 grams of β-hydroxyethyl α-methacrylate boiling at 89° to 92° C. at 7 mm. of Hg pressure were obtained. The product had a saponification value of 131 against a calculated value of 130.

*Example 3.—β-Hydroxypropyl α-methacrylate*

86 grams of α-methacrylic acid, 70 grams of propylene oxide, 100 cc. of benzene, 0.2 gram hydroquinone, and 0.5 cc. of pyridine were heated in an autoclave at 65° to 75° C. for 36 hours. The mixture was, then, vacuum distilled and a yield of 60 grams of β-hydroxypropyl α-methacrylate boiling at 90° to 93° C. at 7 mm. of Hg pressure were obtained.

In the manner illustrated above, acrylic acid and propylene oxide react in the presence of pyridine to give β-hydroxypropyl acrylate.

By the term "propylene oxide," I mean the compound which is represented by the following formula:

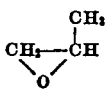

What I claim as my invention and desire to be secured by Letter Patent of the United States is:

1. A process for preparing glycol monoesters comprising reacting an acid selected from the group consisting of acrylic and α-methacrylic acids with an alkylene oxide selected from the group consisting of ethylene and propylene oxides, in the presence of a tertiary amine catalyst having a dissociation constant in water at 25° C. of from $1 \times 10^{-8}$ to $1 \times 10^{-10}$.

2. A process for preparing glycol monoesters comprising reacting an acid selected from the group consisting of acrylic and α-methacrylic acids and an alkylene oxide selected from the group consisting of ethylene and propylene oxides, in the presence of a tertiary amine catalyst having a dissociation constant in water at 25° C. of from $1 \times 10^{-8}$ to $1 \times 10^{-10}$, the concentration of the catalyst being from 0.1 to 5.0 per cent of the weight of the acid employed.

3. A process for preparing β-hydroxyethyl acrylate comprising reacting acrylic acid and ethylene oxide in the presence of a tertiary amine catalyst having a dissociation constant in water at 25° C. of from $1 \times 10^{-8}$ to $1 \times 10^{-10}$, the concentration of the catalyst being from 0.1 to 5.0 per cent of the weight of the acrylic acid employed.

4. A process for preparing β-hydroxyethyl α-methacrylate comprising reacting α-methacrylic acid and ethylene oxide in the presence of a tertiary amine catalyst having a dissociation constant in water at 25° C. of from $1 \times 10^{-8}$ to $1 \times 10^{-10}$, the concentration of the catalyst being from 0.1 to 5.0 per cent of the weight of the α-methacrylic acid employed.

5. A process for preparing β-hydroxypropyl acrylate comprising reacting acrylic acid and propylene oxide in the presence of a tertiary amine catalyst having a dissociation constant in water at 25° C. of from $1 \times 10^{-8}$ to $1 \times 10^{-10}$, the concentration of the catalyst being from 0.1 to 5.0 per cent of the weight of the acrylic acid employed.

6. A process for preparing β-hydroxyethyl acrylate comprising reacting acrylic acid and ethylene oxide in the presence of pyridine, as a catalyst, the concentration of the pyridine being from 0.1 to 5.0 per cent of the weight of the acrylic acid employed.

7. A process for preparing β-hydroxyethyl α-methacrylate comprising reacting α-methacrylic acid and ethylene oxide in the presence of pyridine, as a catalyst, the concentration of the pyridine being from 0.1 to 5.0 per cent of the weight of the α-methacrylic acid employed.

8. A process for preparing β-hydroxypropyl acrylate comprising reacting acrylic acid and propylene oxide in the presence of pyridine, as a catalyst, the concentration of the pyridine being from 0.1 to 5.0 per cent of the weight of the acrylic acid employed.

JOHN R. CALDWELL.

No reference cited.